(12) United States Patent
Sakaguchi (10) Patent No.: US 10,135,052 B2
(45) Date of Patent: Nov. 20, 2018

(54) STACKED BATTERY AND METHOD OF MANUFACTURING SAME

(71) Applicant: Automotive Energy Supply Corporation, Zama-shi, Kanagawa (JP)

(72) Inventor: Shinichiro Sakaguchi, Fujisawa (JP)

(73) Assignee: AUTOMOTIVE ENERGY SUPPLE CORPORATION, Zama-shi (JP)

( * ) Notice: Subject to any disclaimer, the term of this patent is extended or adjusted under 35 U.S.C. 154(b) by 823 days.

(21) Appl. No.: 14/155,665

(22) Filed: Jan. 15, 2014

(65) Prior Publication Data

US 2014/0205886 A1    Jul. 24, 2014

(30) Foreign Application Priority Data

Jan. 21, 2013  (JP) ................ 2013-008277

(51) Int. Cl.
*H01M 2/16* (2006.01)
*H01M 10/04* (2006.01)

(52) U.S. Cl.
CPC ........ *H01M 2/1646* (2013.01); *H01M 2/166* (2013.01); *H01M 2/1653* (2013.01); *H01M 2/1686* (2013.01); *H01M 10/0413* (2013.01); *Y10T 29/49108* (2015.01)

(58) Field of Classification Search
CPC ............. H01M 10/04; H01M 10/0413; H01M 2/1646; H01M 2/1653; H01M 2/1686; H01M 2/166; H01M 2/14; Y10T 29/49108

USPC ......................................... 429/149; 29/623.1
See application file for complete search history.

(56) References Cited

U.S. PATENT DOCUMENTS 5,470,676 A * 11/1995 Nakano ............... H01M 2/1686
                                                           429/139
2008/0070115 A1* 3/2008 Saruwatari ............. H01M 2/06
                                                           429/211

FOREIGN PATENT DOCUMENTS

JP      2009-218105 A    9/2009

* cited by examiner

*Primary Examiner* — Tamir Ayad
(74) *Attorney, Agent, or Firm* — Foley & Lardner LLP (57) ABSTRACT

A stacked battery including two kinds of electrodes 1, 2 and separators 3 through each of which one of the two kinds of electrodes 1 is stacked on another of the two kinds of electrodes 2, each of separators 3 including bonding portion 7 in which separator 3 stacked on the one of the two kinds of electrodes 1 and separator 3 stacked on the another of the two kinds of electrodes 2 are partly bonded to each other on a lateral side of the one of the two kinds of electrodes 1, and non-bonding portion 8 in a curve form which extends at least from a position in which separator 3 is contacted with an end surface of the another of the two kinds of electrodes 2 toward a lateral side of the another of the two kinds of electrodes 2.

3 Claims, 5 Drawing Sheets

STACKED BATTERY AND METHOD OF MANUFACTURING SAME

TECHNICAL FIELD

The present invention relates to a stacked battery constructed such that one or two kinds of electrodes (positive electrodes and negative electrodes) is stacked on another of the two kinds of electrodes through each of separators, and a method of manufacturing the stacked battery.

BACKGROUND ART

A stacked battery constructed such that one of two kinds of electrodes (positive electrodes and negative electrodes) is stacked on another of the two kinds of electrodes through each of separators has a battery characteristic that is lowered when there occurs positional displacement of each of the electrodes. In order to prevent the battery characteristic from being lowered, each of the separators is prepared in the form of a one open ended bag, and one of the two kinds of electrodes (positive electrode) is inserted into the bag-shaped separator. As a result, positional displacement of the one of the two kinds of electrodes can be prevented. However, in this construction, another of the two kinds of electrodes (negative electrode) is disposed on an outside of the bag-shaped separator, whereby there is a possibility that positional displacement of the another of the two kinds of electrodes occurs.

In contrast, in an embodiment of a stacked battery recited in Patent Literature 1, a sheet of an elongated separator is folded in a zigzag form such that there are provided multiple open portions including open portions opened in one direction and open portions opened in the other direction. One of two kinds of electrodes is inserted into the open portions opened in one direction, and another of the two kinds of electrodes is inserted into the open portions opened in the other direction. In this construction, an end face of each of the two kinds of electrodes abuts on a fold of the zigzag-folded separator, so that each of the two kinds of electrodes can be held in place with respect to the direction in which each of the two kinds of electrodes is inserted into the separator.

Further, in another embodiment of the stacked battery recited in Patent Literature 1, a plurality of separators double folded over such that one of the two kinds of electrodes is interposed between opposing faces of each of the separators are prepared, and the plurality of separators are stacked on one another via another of the two kinds of electrodes. After that, the plurality of separators are fused to each other such that the another of the two kinds of electrodes is interposed between the separators to thereby be held in place.

CITATION LIST

Patent Literature

Patent Literature 1: Japanese Patent Application Unexamined Publication No. 2009-218105

SUMMARY OF INVENTION

Technical Problem

In the conventional method of restricting displacement of both of the two kinds of electrodes, a restricting section is provided on only one side of a plurality of sides of one of the two kinds of electrodes or both of the two kinds of electrodes, or the restricting step is complicated. For instance, in the method of restricting displacement of both of the two kinds of electrodes by utilizing a fold of each of the separators, there exists a problem that displacement of the two kinds of electrodes in a direction opposite to the fold, cannot be restricted by only the fold of each separator. Further, in a case where displacement of both of the two kinds of electrodes is restricted by the method of fusing an outer periphery of each of the separators on the sides of the two kinds of electrodes, even when using the fold of each of the separators, the manufacturing process will be considerably complicated as recited in Patent Literature 1, thereby causing a prolonged manufacturing time.

An object of the present invention is to provide a stacked battery in which displacement of an electrode, particularly, positional displacement of both of two kinds of electrodes can be readily prevented or suppressed, and a method of manufacturing the stacked battery.

Solution to Problem

In one aspect of the present invention, there is provided a stacked battery including:
two kinds of electrodes; and
separators through each of which one of the two kinds of electrodes is stacked on another of the two kinds of electrodes,
wherein each of the separators includes a bonding portion in which the separator stacked on the one of the two kinds of electrodes and the separator stacked on the another of the two kinds of electrodes are partly bonded to each other on a lateral side of the one of the two kinds of electrodes, and a non-bonding portion in a curved form which extends at least from a position in which the separator is contacted with an end surface of the another of the two kinds of electrodes toward a lateral side of the another of the two kinds of electrodes.

In a further aspect of the present invention, there is provided a method of manufacturing a stacked battery including two kinds of electrodes and separators through each of which one of the two kinds of electrodes is stacked on another of the two kinds of electrodes, the method including steps of:
preparing the separators each having a multilayer construction in which a heat-shrinkable layer and a low heat-shrinkable layer are laminated on each other;
stacking the one of the two kinds of electrodes on the another of the two kinds of electrodes through each of the separators each that the one of the two kinds of electrodes is interposed between the low heat-shrinkable layers of the separators which are opposed to each other, and the another of the two kinds of electrodes is interposed between the heat-shrinkable layers of the separators which are opposed to each other;
partly bonding the opposed low heat-shrinkable layers of the separators to each other on a lateral side of the one of the two kinds of electrodes; and
heating the heat-shrinkable layer of a non-bonding portion of each of the separators to undergo heat shrinkage to form the separator into a curved shape extending at least from a position in which the separator is contacted with an end surface of the another of the two kinds of electrodes toward a lateral side of the another of the two kinds of electrodes.

Effect of Invention

According to the present invention, it is possible to readily prevent or suppress positional displacement of electrodes of a stacked battery. Further, when preventing or suppressing positional displacement of both of two kinds of electrodes, opposing separators are bonded to each other only on lateral sides of one of the two kinds of electrodes, and are not bonded to each other on lateral sides of another of the two kinds of electrodes. Therefore, the number of a bonding operation for bonding the opposing separators is relatively small, so that the bonding step can be readily carried out and the manufacturing cost can be reduced.

DESCRIPTION OF EMBODIMENTS

In the following, embodiments of the present invention are explained by referring to accompanying drawings.

Figure 1:
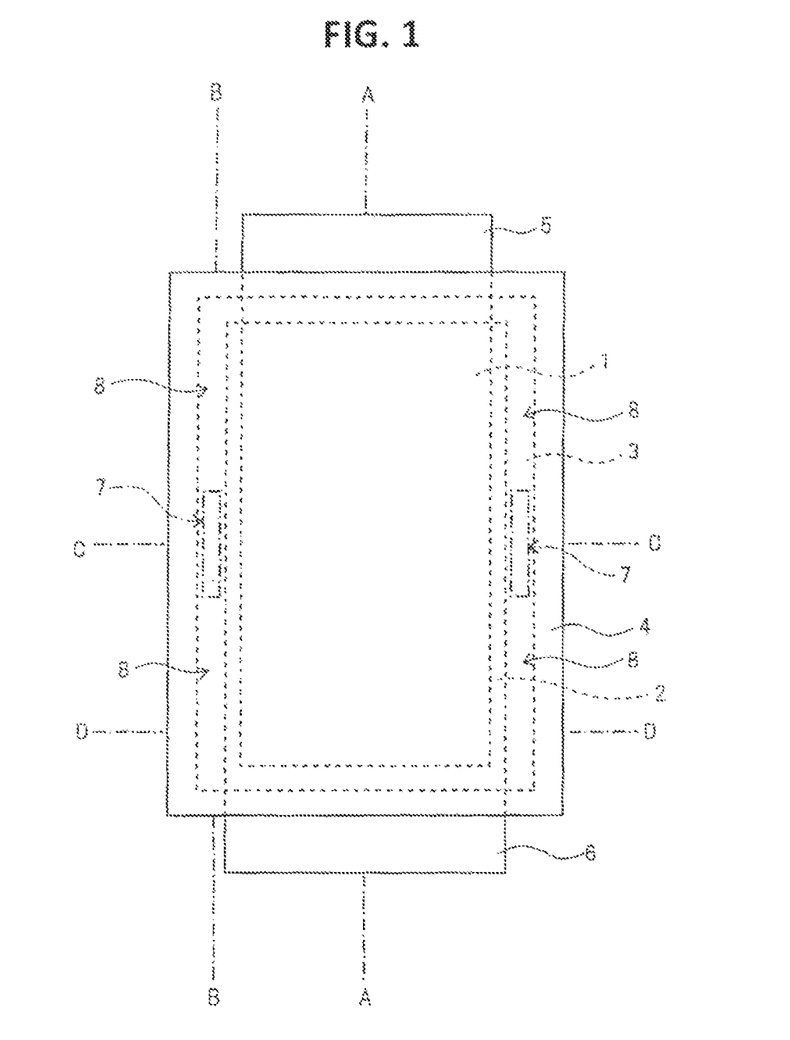
FIG. 1 is a plan view of a stacked battery according to a first embodiment of the present invention.
Figure 2:
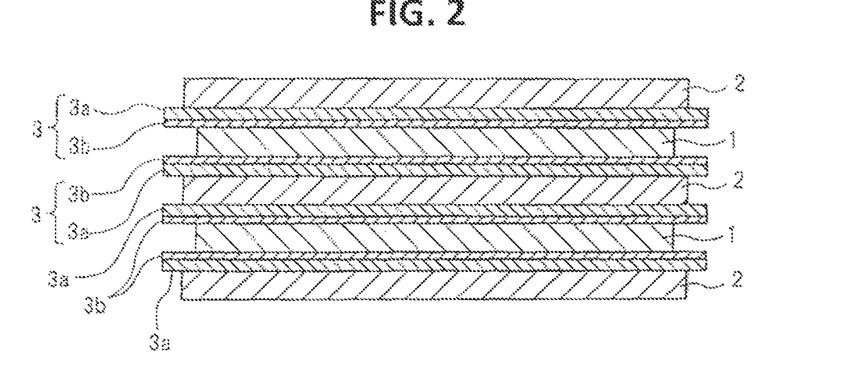
FIG. 2 is a sectional view of an essential part of the stacked battery, taken along line A-A as shown in FIG. 1.
Figure 3:
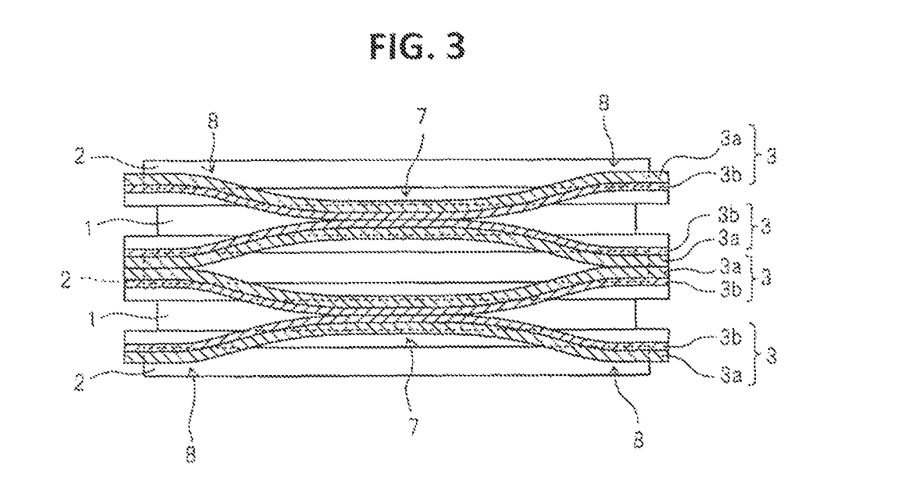
FIG. 3 is a sectional view of an essential part of the stacked battery, taken along line B-B as shown in FIG. 1.
Figure 4:
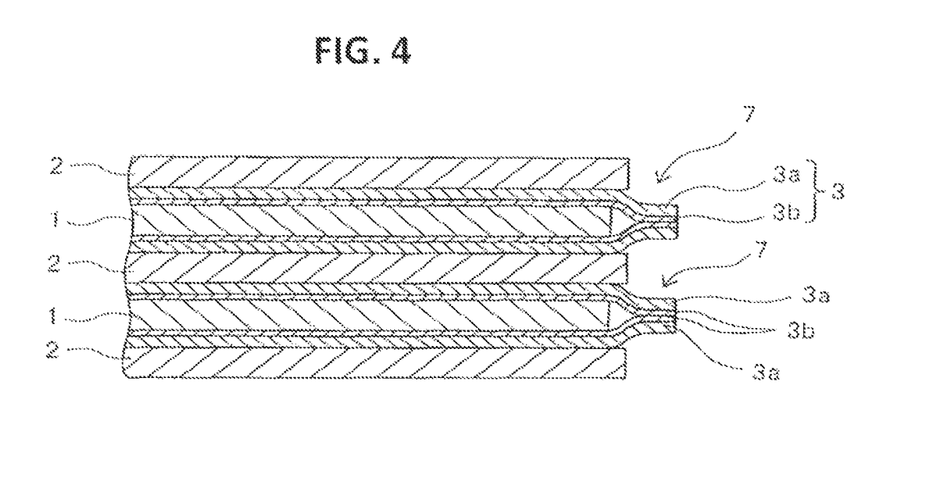
FIG. 4 is a sectional view of an essential part of the stacked battery, taken along line C-C as shown in FIG. 1.
Figure 5:
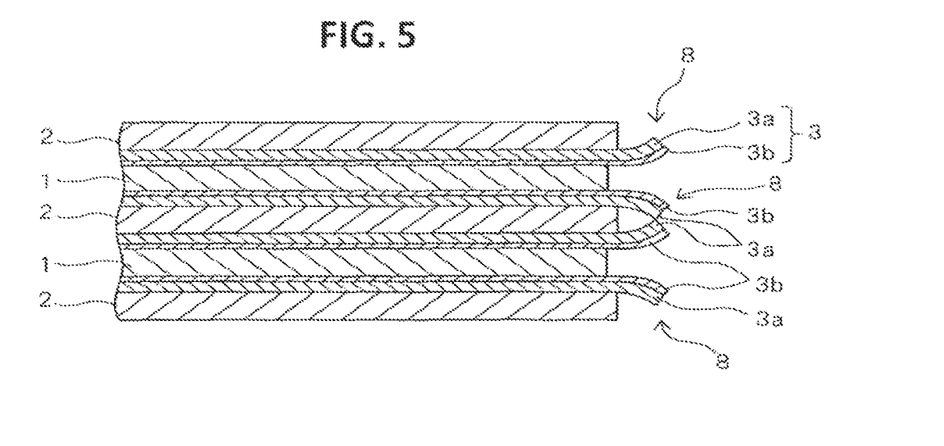
FIG. 5 is a sectional view of an essential part of the stacked battery, taken along line D-D as shown in FIG. 1.

FIG. 1 shows a stacked battery according to a first embodiment of the present invention. FIG. 2 is a sectional view taken alone line A-A as shown in FIG. 1, which shows a central part of the stacked battery. FIG. 3 is a sectional view taken along line B-B as shown in FIG. 1, which shows connection portions and non-connection portions disposed in an essential part of the stacked battery. FIG. 4 is a sectional view taken along line C-C as shown in FIG. 1, which shows the connection portions disposed in as essential part of the stacked battery. FIG. 5 is a sectional view taken along line D-D as shown in FIG. 1, which shows the non-connection portions disposed in an essential part of the stacked battery. In the stacked battery, a stacked body is formed of two kinds of electrodes, i.e., positive electrodes (one of the two kinds of electrodes) 1 and negative electrodes (another of the two kinds of electrodes) 2 and separators 3, each positive electrode 1 and each negative electrode 2 being alternately stacked on one another through each separator 3. The stacked body is covered with laminate films 4 on both one surface (upper surface) thereof and an opposite surface (lower surface) thereof (laminate films 4 are not shown in FIGS. 2-5 and 8-10). After injecting an electrolyte solution between laminate films 4, laminate films 4 are sealed to complete a stacked battery. Connection electrode 5 connected to positive electrodes 1 and connection electrode 6 connected to negative electrodes 2 extend through a bonding portion of laminate films 4, and are exposed to an outside. Separator 3 is a multi-layer structure constituted of, for instance, heat-shrinkable layer 3a formed of a stretched film made of a polyolefin-based resin (such as polypropylene, polyethylene, etc.) as a generally used material for a separator and low heat-shrinkable layer 3b formed of a porous layer made of an inorganic material such as ceramics, which layers are laminated on each other. The plurality of separators 3 are stacked while alternately turning upside down such that positive electrode 1 is interposed between low heat-shrinkable layers 3b of opposing separators 3 and negative electrode 2 is interposed between heat-shrinkable layers 3a of opposing separators 3.

In this embodiment, separator 3 disposed between positive electrode 1 and negative electrode 2 includes bonding portion 7 and non-bonding portions 8 which are located on lateral sides of each of positive electrode 1 and negative electrode 2. In the construction shown in FIG. 1, separator 3 includes one bonding portion 7 and non-bonding portions 8 disposed on both sides of the one bonding portion 7, along each of left and right side surfaces of electrodes 1, 2. As shown in FIGS. 3 and 4, in bonding portion 7, low heat-shrinkable layer 3b of one separator 3 is bonded to low heat-shrinkable layer 3b of another separator 3 which is opposed to the one separator 3 such that positive electrode 1 is interposed therebetween. On the other hand, as shown in FIGS. 3 and 5, in each of non-bonding portions 8, heat-shrinkable layer 3a of separator 3 is formed into a curved shape which extends at least from a position in which heat-shrinkable layer 3a is contacted with an end surface (a lateral side surface) of negative electrode 2 toward the lateral side of the negative electrode 2 due to heat shrinkage. In this construction, negative electrode 2 is disposed to be interposed between heat-shrinkable layers 3a of separators 3 which are opposed to each other, so that both separator 3 located on a lower layer side of the negative electrode 2 and separator 3 located on an upper layer side of the negative electrode 2 are curved toward the lateral side of negative electrode 2. Therefore, there occurs such an effect that the end surface of negative electrode 2 is hooked on the upper layer side separator 3 and the lower layer side separator 3. Accordingly, positive electrode 1 is restrained from moving by bonding portion 7 of separator 3 which is located on each of the lateral sides of positive electrode 1, so that positional displacement of positive electrode 1 can be prevented. Negative electrode 2 also can be prevented from positional displacement by being hooked on non-bonding portions 8 (curved portions) of separator 3 which are located on each of the lateral sides of negative electrode 2. More specifically, relative displacement of positive electrode 1 and separator 3 can be prevented, and relative displacement of negative electrode 2 and separator 3 can be suppressed. Consequently, relative displacement of positive electrode 1 and negative electrode 2 can be suppressed. Thus, one sheet of separator 3 can perform an effect of simultaneously suppressing positional displacement of positive electrode 1 disposed adjacent to one surface of separator 3 and positional displacement of negative electrode 2 disposed adjacent to an opposite surface of separator 3.

According to this embodiment, relative displacement of positive electrode 1 and negative electrode 2 can be prevented or suppressed in which direction thereof. In addition, bonding of separators 3 opposed to each other by heat fusion or ultrasonic fusion is carried out only on the lateral sides of positive electrode 1, but is not carried out on the lateral sides of negative electrode 2. Therefore, the number of the bonding portions is reduced, thereby facilitating the manufacturing process and reducing the manufacturing cost.

Examples of materials usable for heat-shrinkable layer 3a and less heat-shrinkable layer 3b of separator 3 are as follows.

Examples of the material for heat-shrinkable layer 3a may include polyolefins such as polyethylene (PE) and polypropylene (PP). These materials may be used solely, and also may be used in combination of any two or more thereof by blending or polymerizing them with each other or further laminating them on each other. The materials are preferably monoaxially or biaxially stretched in order to impart heat shrinkage properties thereto. Further, it is preferred that heat-shrinkable layer 3a has a thickness of 5-30 μm and a void ratio of 30-70% in consideration of influence on battery characteristics.

Low heat-shrinkable layer 3b is formed and laminated on heat-shrinkable layer 3a. Low heat-shrinkable layer 3b is not particularly limited to a specific one as long as the layer has heat shrinkage properties lower than a fine porous resin film that constitutes the above-described heat-shrinkable layer 3a. Further, it is preferred that low heat-shrinkable layer 3b has a thickness of 1-20 μm and a void ratio of 30-70% in consideration of influence on battery characteristics and heat resistance.

Preferably, examples of the material for low heat-shrinkable layer 3b include a porous layer containing ceramics, a porous layer made of a heat-resistant resin, and a heat-resistant porous layer formed of a composite material of ceramics and a heat-resistant resin.

Examples of the ceramics may include alumina ($Al_2O_3$), silica ($SiO_2$), magnesia (MgO), titania ($TiO_2$), zirconia ($ZrO_2$), etc. These ceramics may be used solely, and also may be used in combination of any two or more thereof by blending or sintering them with each other. The particle size of the ceramics is preferably 0.1-10 μm. In addition, upon forming a heat-resistant porous layer that contains these ceramics, a binder may be used as long as heat resistance and porous properties can be ensured. Examples of such a binder may include polyvinylidene fluoride (PVdF), polytetrafluoroethylene (PTFE), polyacrylonitrile (PAN), styrene-butadiene rubber (SBR), carboxymethyl cellulose (CMC), etc. These binders may be used solely, and also may be used in combination of any two or more thereof by blending or polymerizing them with each other. In addition, the binder preferably is used in the substantially same amount as an amount of generally used binder. Specifically, the amount of the binder contained in the heat-resistant porous layer is 0.5-1.5% by mass, and more preferably, 1-10% by mass. For instance, the heat-resistant porous layer can be obtained by coating the fine porous resin film with a slurry (a heat-resistant porous layer forming material) prepared by dispersing the above-described ceramics and the above-described binder in a solvent such as N-methyl-2-pyrrolidone (NMP) and then drying the fine porous resin film thus coated.

Examples of the heat-resistant resin may include polyimides, aramids, polyamideimides, polyethyl sulfones, polyetherimides, polyphenylene ethers, etc. A porous layer of the heat-resistant resin can be obtained by coating a fine porous resin film with a solution prepared by dissolving these heat-resistant resins in a good solvent, and after that, contacting the coated fine porous resin film with a poor solvent to thereby deposit a heat-resistant resin on the fine porous resin film, and subjecting the thus treated fine porous resin film to desolventizing treatment. Examples of the good solvent may include N-methyl-2-pyrolidone (NMP), N,N-dimethylacetamide (DMA), dimethyl sulfoxide (DMSO), toluene, xylene, etc. Examples of the poor solvent may include water, ethanol, methanol, etc.

Further, a porous layer made of a composite of ceramics and a heat-resistant resin can be obtained by coating a fine porous rosin film with a slurry (a heat-resistant porous layer forming material) prepared by blending and dispersing a ceramic powder in the above-described coating solution of the heat-resistant resin, and after that, conducting the same procedures as described above. The slurry may be applied to a whole surface of the fine porous resin film, or may be applied to a part of the surface of the fine porous resin film except for a portion to be used as bonding portion 7 as explained later and the vicinity thereof.

Next, a method of manufacturing the stacked battery according to the present invention is explained. Firstly, positive electrodes 1, negative electrodes 2 and separators 3 are stacked on one another in the following order: negative electrode 2, separator 3, positive electrode 1, negative electrode 2, . . . . At this time, a plurality of separators 3 are stacked while turning upside down such that positive electrode 1 is interposed between low heat-shrinkable layers 3b of separators 3 which are opposed to each other and negative electrode 2 is interposed between heat-shrinkable layers 3a of separators 3 which are opposed to each other.

During the stacking step, on each of the lateral sides of each of positive electrodes 1, separator 3 located on a lower layer side of the positive electrode 1 and separator 3 located on an upper layer side of the positive electrode 1 are partly overlapped with each other and bonded to each other to form bonding portion 7. Examples of a method of forming bonding portion 7 may include a method of bonding low heat-shrinkable layers 3b to each other with an adhesive such as a hot pressing adhesive, a solution coating adhesive, a thermosetting adhesive, an ultraviolet curable adhesive, etc., a method of bonding upper and lower heat-shrinkable layers 3a to each other in which resins in the respective layers are melted and integrated while removing low heat-shrinkable layers 3b by applying an ultrasonic wave during pressing with a mold, or a method of bonding upper and lower heat-shrinkable layers 3a to each other by ultrasonic wave application or heat pressing after previously removing a part of each of low heat-shrinkable layers 3b.

After that, a stacked body formed by stacking all of positive electrodes 1, negative electrodes 2 and separators 3 is subjected to heating as a whole. By the heating, the stacked body is dried as a whole, and heat-shrinkable layer 3a of non-bonding portions 8 located in outer periphery of each of separators 3 is heat-shrunk. Since separator 3 has a construction in which heat-shrinkable layer 3a and low heat-shrinkable layer 3b are laminated on each other, when heated, only heat-shrinkable layer 3a as shrunk but low heat-shrinkable layer 3b is not largely shrunk, so that there is generated a curved portion concave toward the side of heat-shrinkable layer 3a. Each of negative electrodes 2 is interposed between heat-shrinkable layers 3a of separators 3 which are opposed to each other, and therefore, both separator 3 located on a lower layer side of the negative electrode 2 and separator 3 located on an upper layer side of the negative electrode 2 are curved toward the lateral sides of the negative electrode 2 interposed therebetween. As a result, there occurs such a function that end surfaces of the negative electrode 2 are hooked on the separator 3 located on the lower layer side of the negative electrode 2 and the separator 3 located on the upper layer side of the negative electrode 2.

The time at which bonding portion 7 is formed by overlapping and fusing separator 3 located on the lower layer side of positive electrode 1 and separator 3 located on the upper layer side of positive electrode 1 to each other by heat or ultrasonic waves is not particularly limited. Bonding portion 7 may be formed after stacking separator 3 on positive electrode 1. Bonding portion 7 also may be formed by previously partially fusing a pair of separators 3, and after that, inserting positive electrode 1 between the pair of separators 3. Further, in end portions of the stacked battery in a longitudinal direction thereof (an upper end portion and a lower end portion as shown in FIG. 1), opposing separators 3 may be bonded to each other, or may be free from being bonded to each other. In a case where opposing separators 3 are bonded to each other in the longitudinal end portion of the stacked battery, the bonding operation may be carried out in a step separate from the above-described step of forming bonding portion 7 on each of the lateral sides of positive electrode 1, and also may be simultaneously carried out to form the opposing separators 3 into a bag shape. In addition, the stacked body may be formed by folding an elongated multilayer film, placing the folds of the multilayer film in planes perpendicular to the lateral side surfaces of electrodes 1, 2, and inserting electrodes 1, 2 between opposing faces of the folded multilayer film toward the corresponding folds.

Figure 6:
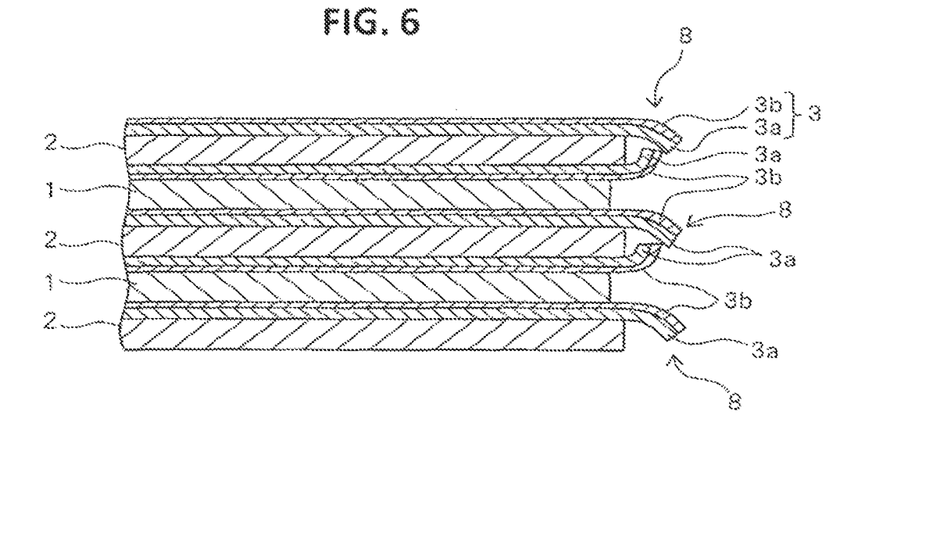
FIG. 6 is a sectional view of a modification of the stacked battery according to the first embodiment of the present invention.

Further, another example of the method of manufacturing the stacked battery according to the present invention is explained. When positive electrodes 1, negative electrodes 2 and separators 3 are in turn stacked on one another, bonding portions 7 may be formed every time at which separator 3 is stacked on positive electrode 1. Also, when stacking positive electrodes 1, negative electrodes 2 and separators 3 in turn, separators 3 may be heated to shrink heat-shrinkable layers 3a thereof to form carved portions extending toward the lateral sides of negative electrode 2 interposed between the separators 3 every time at which negative electrode 2 is stacked on separator 3, and every time at which another separator 3 is stacked on the negative electrode 2. According to this method, the treatment of non-bonding portions 8 is conducted as follows. That is, firstly, separator 3 is heated at a time at which negative electrode 2 is stacked on the separator 3, thereby curving non-bonding portions 8 of the separator 3 toward the lateral sides of the negative electrode 2. Subsequently, at a time at which another separator 3 is stacked on the negative electrode 2, the another separator 3 is heated to thereby curve non-bonding portions 8 thereof toward the lateral sides of the negative electrode 2. At this time, each of the end surfaces of the negative electrode 2 is already covered with the non-bonding portions 8 (curved portions) of the separator 3 located on the lower layer side of the negative electrode 2. Accordingly, as shown in FIG. 6, the end surface of the negative electrode 2 is brought into such a state that the end surface is further covered with the non-bonding portions 8 (curved portions) of the separator 3 located on the upper layer side of the negative electrode 2 from an outside of the non-bonding portions 8 (curved portions) of the separator 3 located on the lower layer side of the negative electrode 2. According to this method, positional displacement of negative electrodes 2 can be prevented with higher reliability.

Figure 7:
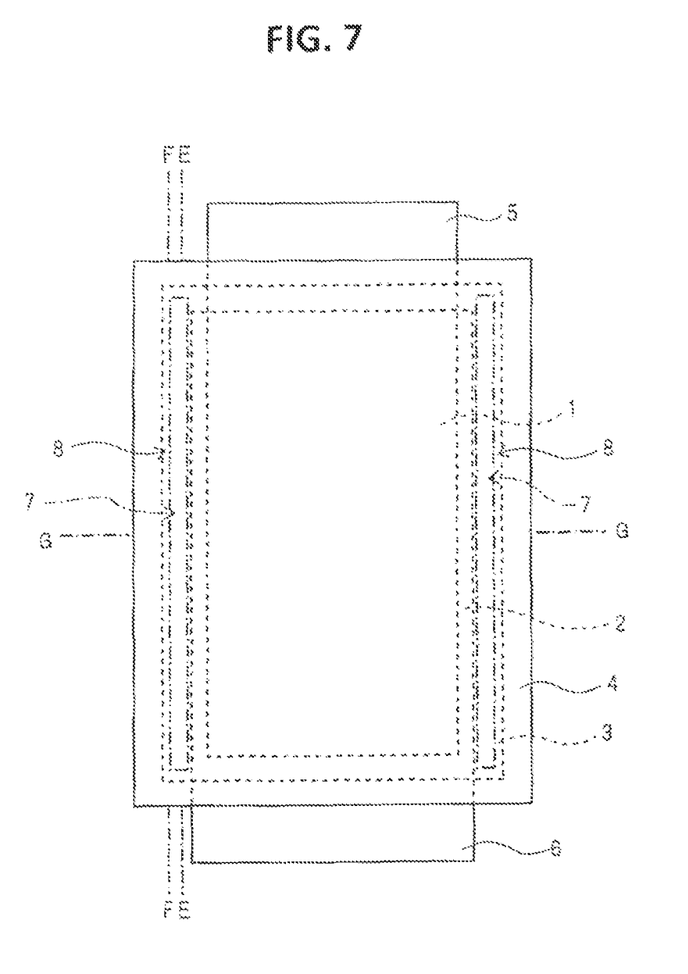
FIG. 7 is a plan view of a stacked battery according to a second embodiment of the present invention.
Figure 8:
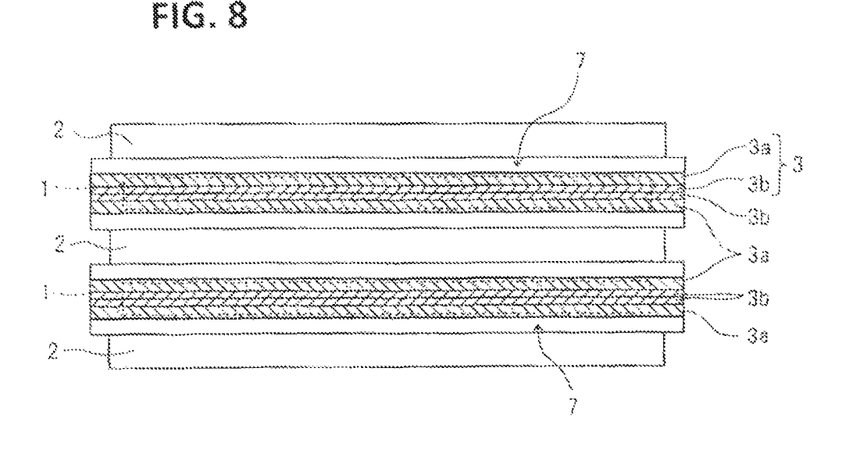
FIG. 8 is a sectional view of an essential part of the stacked battery, taken along line E-E as shown in FIG. 7.
Figure 9:
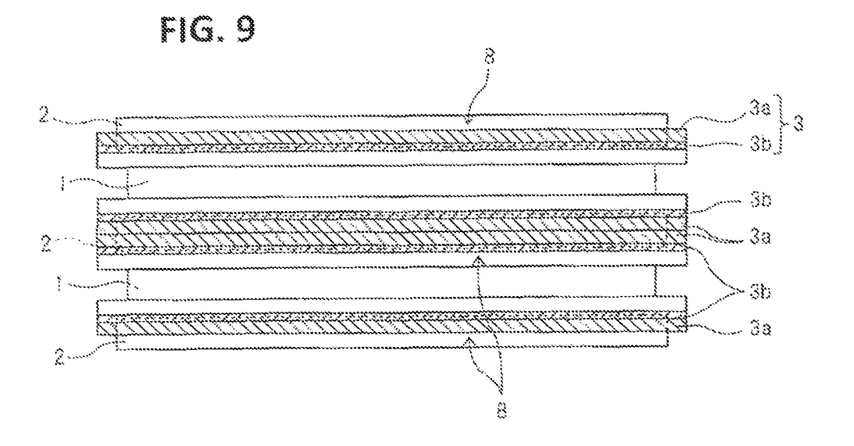
FIG. 9 is a sectional view of an essential part of the stacked battery, taken along line F-F as shown in FIG. 7.
Figure 10:
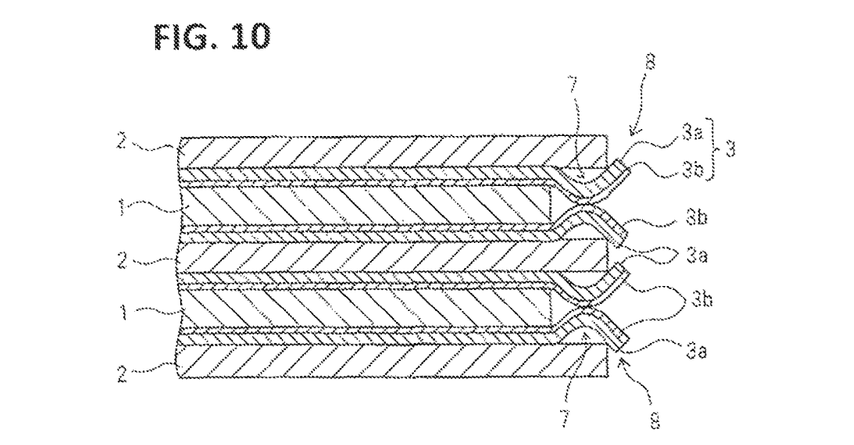
FIG. 10 is a sectional view of an essential part of the stacked battery, taken along line G-G as shown in FIG. 7.

FIG. 7 shows a stacked battery according to a second embodiment of the present invention. The stacked battery according to the second embodiment has same basic structure as that of the stacked battery according to the first embodiment, but differs from the first embodiment in arrangement of bonding portion 7 and non-bonding portion 8.

In this embodiment, as shown in FIG. 7, bonding portion 7 is disposed in a position close to positive electrode 1 along each of lateral side surfaces of positive electrode 1 over a whole length of positive electrode 1, and non-bonding portion 8 is disposed on an outer peripheral side of bonding portion 7. Non-bonding portion 8 is a curved portion extending toward each of the lateral sides of negative electrode 2. That is, in the first embodiment, bonding portion 7 and non-bonding portions 8 (curved portions) coexist along a direction parallel to the lateral side surface of positive electrode 1. In contrast, in the second embodiment, bending portion 7 shown in FIG. 8 and non-bonding portion 8 (curved portion) shown in FIG. 9 coexist along a width direction of positive electrode 1 (a direction perpendicular to the lateral side surface thereof). According to the second embodiment, bonding portion 7 that serves to prevent positional displacement of positive electrode 1 and non-bonding portion 8 that serves to prevent positional displacement of negative electrode 2 are present over a whole length of the lateral side surface of each of positive electrode 1 and negative electrode 2. With this arrangement, positional displacement of electrodes 1, 2 can be prevented with high reliability.

Low heat-shrinkable layer 3b of separator 3 may be formed over a whole area of one surface (upper or lower surface) of separator 3 with a uniform thickness, or may be formed in a part of the area of the one surface of separator 3. For instance, low heat-shrinkable layer 3b has an end edge located in a region extending between the end of positive electrode 1 and bonding portion 7, so that low heat-shrinkable layer 3b is not formed in an outside of the region. The end edge of low heat-shrinkable layer 3b may be located to be retreated inwardly from the end of negative electrode 2 as long as separator 3 is curved toward the lateral side of negative electrode 2. However, in such a case, a distance from the end of negative electrode 2 to the end edge of heat-shrinkable layer 3a is preferably 1 mm or less, and more preferably, 0.5 mm or less.

In addition, a central portion of separator 3 may be a region (a double-face region) in which low heat-shrinkable layer 3b is formed on both surfaces of heat-shrinkable layer 3a, and an outer peripheral portion of separator 3 which is located on an outside of the central portion may be a region (a single-face region) in which low heat-shrinkable layer 3b is formed on only one surface of heat-shrinkable layer 3a. In such a case, the double-face region is not deformable, and the single-face region is deformable. Accordingly, a region of separator 3 in which positive electrode 1 and negative electrode 2 are overlapped with each other is not deformable, and an outside region thereof located on an outside of the central region is deformable. As a result, a curved portion of separator 3 can be generated only in the outside region in order to attain the object of the present invention (suppression of positional displacement of positive electrode 1 and negative electrode 2), while maintaining adhesion in the region in which positive electrode 1 and negative electrode 2 are overlapped with each other.

In the above-described embodiment, all separators 3 in the stacked body have a construction (construction of a curving separator) in which low heat-shrinkable layer 3b is formed on only one surface of heat-shrinkable layer 3a. However, separators 3 may include non-deformable separator 3 such as separator 3 constituted of only low-heat-shrinkable layer 3b or only heat-shrinkable layer 3a, and separator 3 having low heat-shrinkable layer 3b formed on both surfaces of heat-shrinkable layer 3a, in addition to the curving separators 3. In such a case, separators 3 that are curved toward the lateral sides of negative electrode 2 are not always located on both surfaces of the negative electrode 2, but only one sheet of separator 3 that is curved toward the lateral sides of negative electrode 2 may be located on one surface of the negative electrode 2. Even in this case, the function that the end surface of negative electrode 2 are hooked on separator 3 can be performed by the one sheet of separator 3. Therefore, it is possible to suppress displacement of negative electrode 2.

The invention claimed is:

1. A stacked battery comprising:
a plurality of electrodes and a plurality of separators stacked in a stacking direction, wherein individual electrodes of the plurality of electrodes are disposed between adjacent two of the plurality of separators;
wherein each of the plurality of electrodes are either a positive electrode or a negative electrode which are alternately stacked relative to one another in the stacking direction,
each electrode having two major surfaces opposing each other in the stacking direction, and two side surfaces opposing each other in a first direction that is perpendicular to the stacking direction, each of the side surfaces connecting the two major surfaces and extending in a second direction that is perpendicular to the stacking direction;
wherein each of the plurality of separators separates a positive electrode and a negative electrode from each other, each of the plurality of separators having two major surfaces opposing each other in the stacking direction and two lateral end portions opposing each other in the first direction, each of the two lateral end portions extending in the second direction;
wherein first two adjacent separators of the plurality of separators, between which a first one of the plurality of electrodes is interposed, are bonded together at bonding portions;
wherein second two adjacent separators of the plurality of separators, between which a second one of the plurality of electrodes adjacent to the first electrode is interposed, are not bonded together at non-bonding portions that are located at respective lateral end portions of the second two adjacent separators on opposing sides of at least one of the bonding portions in the second direction;
wherein each of the bonding portions is provided along a respective side surface of the first electrode;
wherein, at each bonding portion, the first two adjacent separators of the plurality of separators are bonded to each other at a location in the first direction that is outside the respective side surface of the first electrode, such that a positional displacement of the first electrode in the first direction is prevented; and
wherein at each non-bonding portion, the second two adjacent separators of the plurality of separators are curved such that a positional displacement of the second electrode in the first direction is prevented.

2. The stacked battery of claim 1,
wherein each of the plurality of separators has a high heat-shrinkable layer and a low heat-shrinkable layer, the low heat-shrinkable layer having a degree of heat shrinkage lower than a degree of heat shrinkage of the high heat-shrinkable layer;
wherein the first electrode is disposed between the low heat-shrinkable layers of the first two adjacent separators of the plurality of separators;
wherein the low heat-shrinkable layers of the first two adjacent separators are bonded to each other at a location in the first direction that is outside the respective side surface of the first electrode;
wherein the second electrode is disposed between the high heat-shrinkable layers of the second two adjacent separators.

3. The stacked battery as claimed in claim 1,
wherein in a plan view from the stacking direction, the bonding portions and the non-bonding portions both extend in the second direction along the respective side surfaces of the first and second electrodes.

* * * * *